United States Patent [19]

Griffin

[11] 4,413,961
[45] Nov. 8, 1983

[54] MOTION CONVERSION DEVICE AND ROTARY DISPLACEMENT DEVICE

[76] Inventor: Peter J. Griffin, 13/40 Bayswater Rd., Kings Cross, New South Wales, Australia

[21] Appl. No.: 281,417

[22] Filed: Jul. 8, 1981

[51] Int. Cl.³ .................... F04C 2/00; F16H 35/02
[52] U.S. Cl. ..................................... 418/38; 74/63; 74/393; 74/394; 74/796
[58] Field of Search ............... 418/33, 34, 35, 36, 418/37, 38; 123/222; 74/393, 394, 793, 796, 63

[56] References Cited

U.S. PATENT DOCUMENTS

| | | | |
|---|---|---|---|
| 1,692,160 | 11/1928 | Dormer | 74/63 |
| 1,732,995 | 10/1929 | Tschudi | 418/36 |
| 2,049,122 | 7/1936 | Kuba | 74/63 |
| 2,061,131 | 11/1936 | Bancroft | 418/37 |
| 2,544,480 | 3/1951 | Bancroft | 418/37 |
| 2,612,878 | 10/1952 | Wilson | 418/37 |
| 2,618,984 | 11/1952 | Oliver | 74/394 |
| 3,241,531 | 3/1966 | Bancroft | 418/37 |
| 3,937,187 | 2/1976 | Bergen | 418/38 X |

FOREIGN PATENT DOCUMENTS

| | | | |
|---|---|---|---|
| 590313 | 6/1925 | France | 74/63 |
| 11990 | of 1889 | United Kingdom | 74/63 |

*Primary Examiner*—Leonard E. Smith
*Attorney, Agent, or Firm*—Harness, Dickey & Pierce

[57] ABSTRACT

A motion conversion device comprising a cam mounted for rotation about an axis eccentric to a central axis, said eccentric axis being rotatable about said central axis, the cam having N lobes the outermost points of which are equally spaced around and equidistant from the eccentric axis, N being an odd integer other than 1, means for effecting relative rotation between the central axis and the cam on rotation of the eccentric axis about the central axis or rotation of the cam about its eccentric axis whereby the cam is arranged to rotate about its eccentric axis at an angular velocity of $(2/N+1)$ times the angular velocity of the eccentric axis about the central axis, a pair of cam followers rotatable about an axis substantially coincident with the central axis, the cam followers being in contact with the cam on opposed sides of the central axis and equidistant from the central axis, the cam being formed such that on rotation of the eccentric axis about the central axis at a substantially constant velocity the cam followers undergo 2 N cycles of acceleration from a dwell condition and deceleration to a dwell condition for each revolution of the cam followers.

20 Claims, 15 Drawing Figures

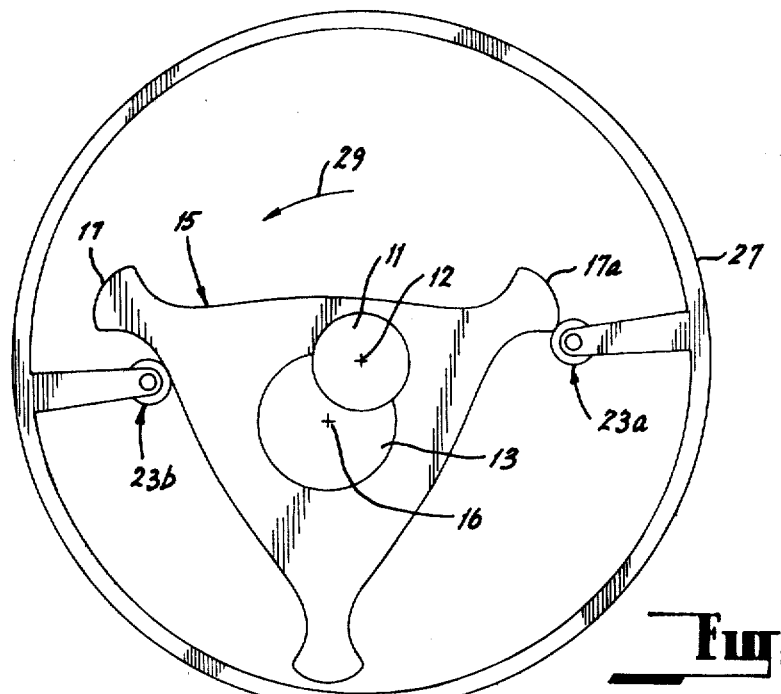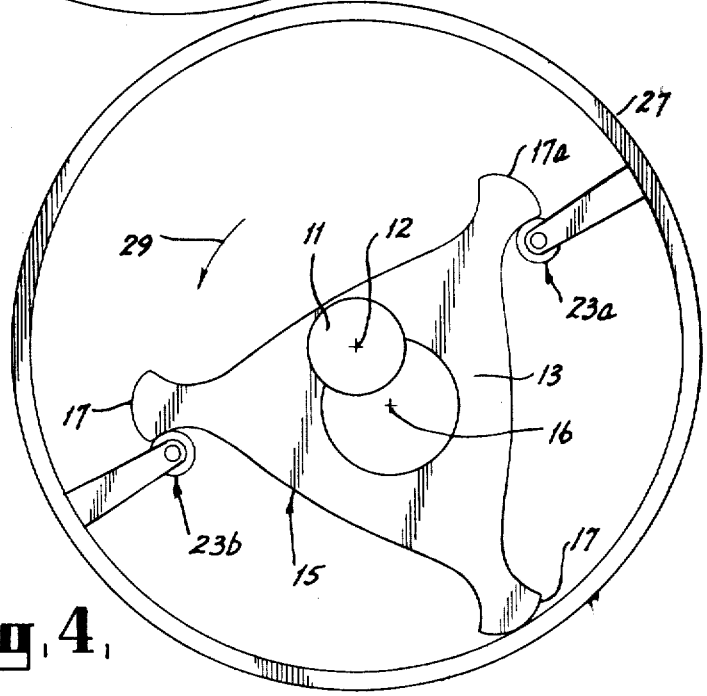

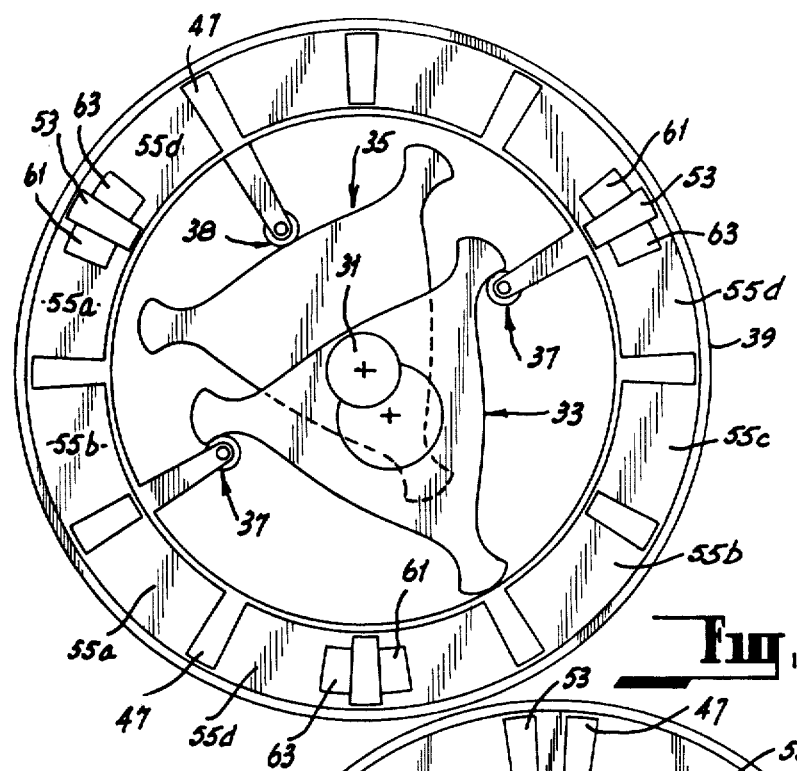
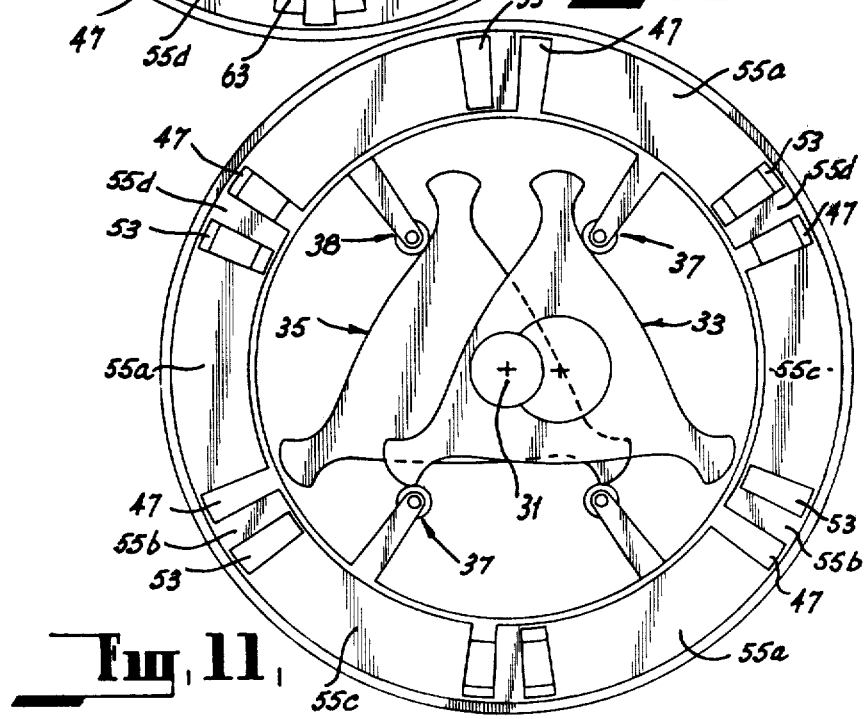

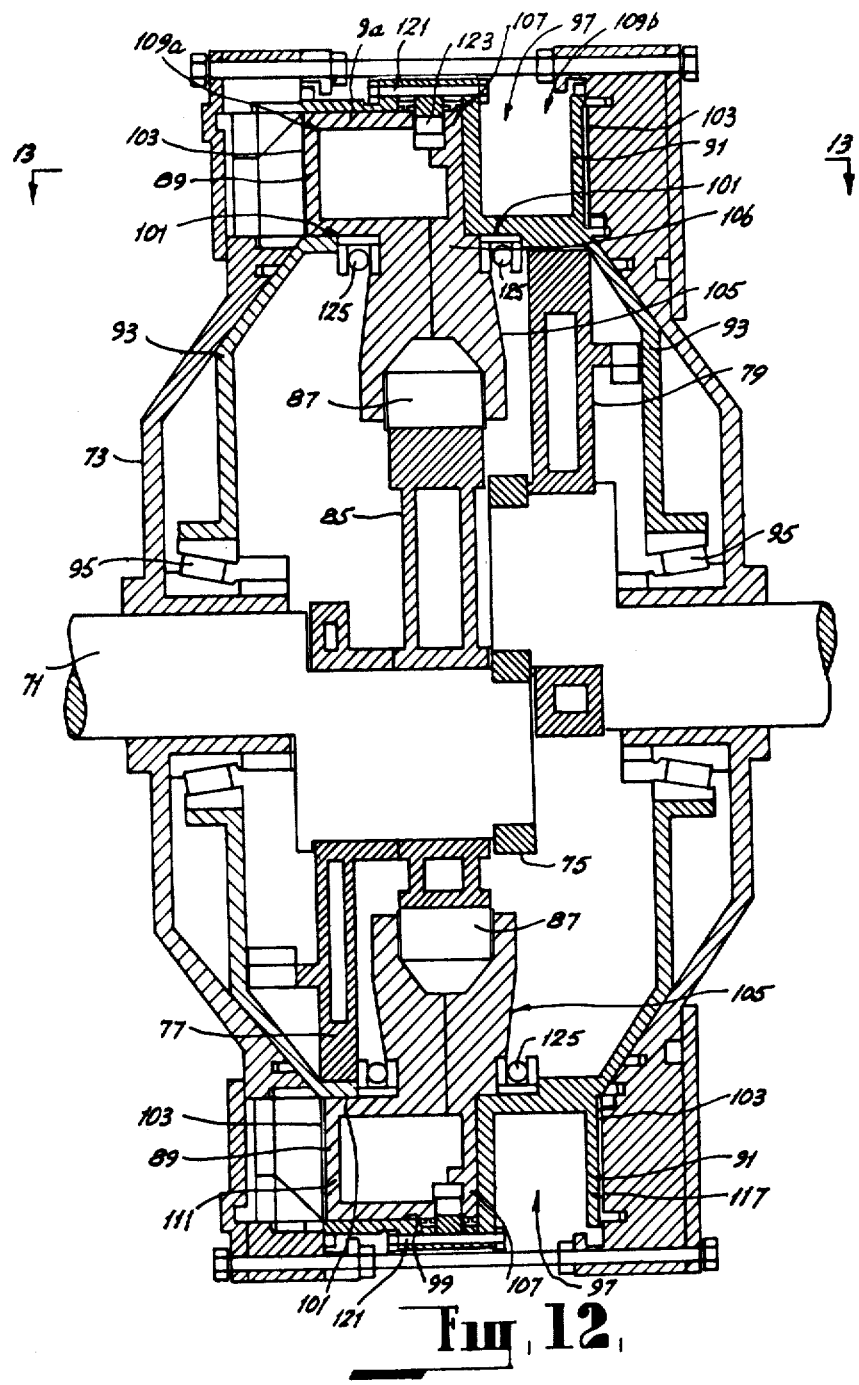

MOTION CONVERSION DEVICE AND ROTARY DISPLACEMENT DEVICE

This invention relates to a motion conversion device.

In one form the invention resides in a motion conversion device comprising a cam mounted for rotation about an axis eccentric to a central axis, said eccentric axis being rotatable about said central axis, the cam having N lobes the outermost points of which are equally spaced around and equidistant from the eccentric axis, N being an odd integer other than 1, means for effecting relative rotation between the central axis and the cam on rotation of the eccentric axis about the central axis or rotation of the cam about the eccentric axis whereby the cam is arranged to rotate about the eccentric axis at an angular velocity of $2/(N+1)$ times the angular velocity of the eccentric axis about the central axis, a pair of cam followers rotatable about an axis substantially coincident with the central axis, the cam followers being in contact with the cam on opposed sides of the central axis and equidistant from the central axis, the cam being formed such that on rotation of the eccentric axis about the central axis at a substantially constant velocity the cam followers undergo 2N cycles of acceleration from a dwell condition and deceleration to a dwell condition for each complete revolution of the cam followers.

Throughout this specification, the term "dwell" is taken to mean substantially or nominally zero velocity. It may well be that at the so called dwell condition, the cam followers have a finite velocity albeit a relatively small velocity.

The motion conversion device provides for the interconversion of constant angular velocity and cyclic angular velocity.

A motion conversion device according to the invention has applications in a rotary mechanism of the "cat and mouse" type in which first and second piston assemblies are arranged to operate in a working chamber. The first and second piston assemblies are adapted to undergo differential motion to effect the "cat and mouse" action in response to the application of differential cyclic angular velocity to two pairs of cam followers forming part of the motion conversion device.

Such a rotary mechanism can be adapted to operate as a fluid pump, a fluid motor, an internal combustion engine or the like. Further, the rotary mechanism can be adapted to perform multiple fluid processing operations which, by way of example, may comprise a first fluid processing operation in the form of an engine cycle which provides output power for operation of a second fluid processing operation in the form of a fluid pumping cycle.

Other fields of application of a motion conversion device according to the invention include indexing operations, and operations in which articles are picked up from rest and returned to rest.

The invention will be better understood by reference to the following descriptions of several specific embodiments as shown in the accompanying drawings wherein:

FIG. 3 is an elevational view of the motion conversion device with the cam followers being shown at the position of maximum acceleration;

FIG. 4 is an elevational view of the motion conversion device with the cam followers being shown at the position of maximum velocity;

FIG. 10 is a schematic elevational view of the rotary mechanism of FIG. 8 with the first cam being shown at a position in which it has turned through 60° from its position at which its respective pair of cam followers were dwelling;

FIG. 11 is a schematic elevational view of the rotary mechanism of FIG. 8 with the first cam being shown at a position in which it has turned through 90° from its position at which its respective pair of cam followers were dwelling;

FIG. 12 is a sectional elevation of one embodiment of a rotary mechanism arranged to perform multiple fluid processing operations;

Figure 1:
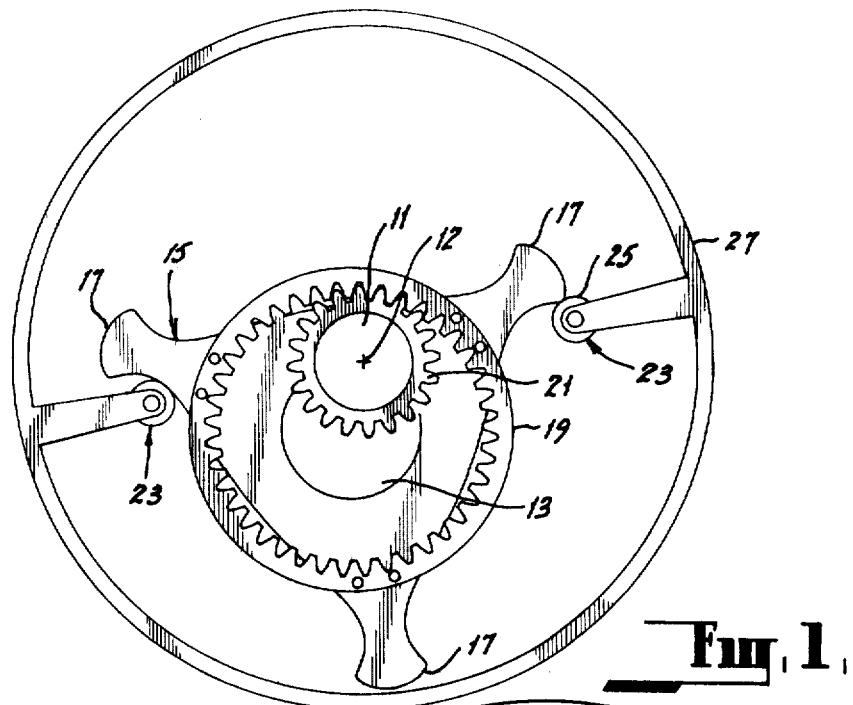
FIG. 1 is a schematic elevational view of the motion conversion device.

Referring to FIGS. 1 to 4 of the accompanying drawings, the motion conversion device of the first embodiment includes a crankshaft 11 the axis of rotation of which defines a central axis 12. On the eccentric portion 13 of the crankshaft there is rotatably mounted a multi-lobed cam 15; the cam is thus rotatable about an axis 16 eccentric to the central axis.

The multi-lobed cam 15 has N lobes 17, where N is an odd integer other than 1; as seen in the drawings, the cam in this embodiment has three lobes. The respective outermost points of the lobes 17 are equally spaced around and equidistant from the eccentric axis 16.

The cam is adapted to rotate about the eccentric axis in the same direction as the crankshaft rotates and at an angular velocity of $2/(N+1)$ times the angular velocity of the crankshaft. In this embodiment the cam is therefore adapted to rotate about the eccentric axis at an angular velocity half that of the crankshaft. Means are provided for maintaining the angular velocity relationship between the cam 15 and the crankshaft 11. Such means may comprise an internal gear 19 co-axial with the cam and fixed to the cam. The internal gear 19 meshes with a gear wheel 21 co-axial with the crankshaft and fixed against rotation relative to a stationary frame of reference. The ratio of the number of teeth of the internal gear 19 to the number of teeth of the gear wheel 21 is $(N+1)/2:(N+1)/2-1$ so as to maintain the prescribed angular velocity relationship between the cam 15 and the crankshaft 11.

On rotation of the crankshaft 11, motion of the cam 15 is a combination of rotation about the eccentric axis 16 and revolution about the central axis 12. As the cam undergoes its motion, the lobes 17 of the cam follow an epitrochoidal path.

A pair of cam followers 23 are rotatable about an axis which is substantially co-incident with the central axis 12. In this embodiment the cam followers 23 are in the form of rollers 25 the axes of rotation of which are substantially parallel to the central axis 12. The cam follower rollers are each mounted on a cam follower carrier 27 which is rotatable about the central axis. The spacing between the cam contacting surfaces of the cam followers 23 is substantially equal to the distance between the outermost point of each cam lobe (with reference to the eccentric axis) and a diametrally opposite point on the cam surface. That is to say, the distance of the points of contact on the cam contacting surface of each cam follower from the central axis when the eccentric axis is at a point of closest approach to the respective cam follower is substantially equal to the length of the smallest of the set of radii of the epitrochoidal paths generated by the cam lobe tips.

The cam is formed such that on rotation of the crankshaft 11 at a substantially constant velocity, the cam followers 23 undergo 2N cycles of acceleration from substantially or nominally zero velocity and deceleration to substantially or nominally zero velocity in making one revolution. Therefore, if rotational motion at a substantially constant angular velocity is imparted to the crankshaft, the cam followers (and hence any output element coupled to the cam followers) will undergo a cyclic angular velocity. Likewise, if a cyclic angular velocity commensurate with said constant angular velocity is imposed on the cam followers, the crankshaft will undergo said constant angular velocity.

The operation of the motion conversion device shown in FIGS. 2 to 4 will now be described on the basis that a constant angular velocity as imposed on the crankshaft 11 (the direction of rotation of the crankshaft being indicated by the arrow 29).

Figure 2:
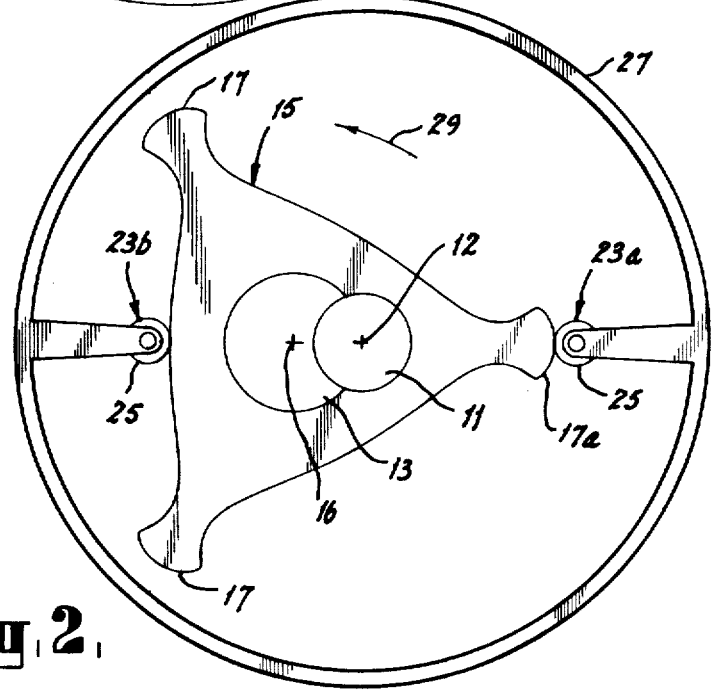
FIG. 2 is an elevation view of the motion conversion device with the cam followers being shown in the dwell position.

In the position shown in FIG. 2, the cam follower 23a is in contact with the tip of the lobe 17a of the cam, and the cam follower 23b is in contact with the point on the cam surface diametrally opposite the tip of the lobe 17a. In this position the eccentric axis 16 is at the point of closest approach to the cam follower 23b and the point of contact between the cam and each cam follower is moving substantially tangentially to the rotational motion of the respective cam follower; therefore, no driving moment is imposed on the cam followers by the cam. The cam followers are in a dwell position at this stage; that is, the followers are at substantially or nominally zero velocity. On continued rotation of the crankshaft, the eccentric axis 16 moves away from the cam follower 23b and as a result of consequent rotation of the cam, a progressively increasing driving moment is imposed on the follower 23b, thus causing the cam followers to undergo cycloidal acceleration. The cam followers are undergoing maximum acceleration at the position illustrated in FIG. 3. The cam followers arrive at their maximum velocity at the position illustrated in FIG. 4, at which position there exists a point of inflexion where the acceleration changes from positive acceleration to negative acceleration (deceleration). On continued rotation of the crankshaft, the cam follower 23a bears on the lobe 17a and the resultant reactionary force causes the cam follower to undergo cycloidal deceleration. At this stage, the eccentric axis is moving towards its position of closest approach to the cam follower 23a. When the cam moves into the position at which the eccentric axis is at its point of closest approach to the cam follower 23a, there is no driving force applied to the cam followers and the cam followers are at a substantially or nominally zero velocity. On continued rotation of the crankshaft, a progressively increasing driving moment is applied to the cam follower 23a, and the cycle of cycloidal acceleration and deceleration of the cam followers is thus repeated. In the illustrated embodiment with a three-lobed cam, the cam followers 23 will undergo six cycles of acceleration from substantially or nominally zero velocity and deceleration to substantially or nominally zero velocity for each of their revolutions, and during that time the cam completes two rotations and the crankshaft completes four rotations.

It should be appreciated that because of forces within the motion conversion device, the cam followers may pass through each so-called dwell position at a finite velocity.

As mentioned beforehand, a motion conversion device according to the invention has applications in effecting compression and expansion of working chambers in rotary mechanisms of the "cat and mouse" type.

Figure 5:
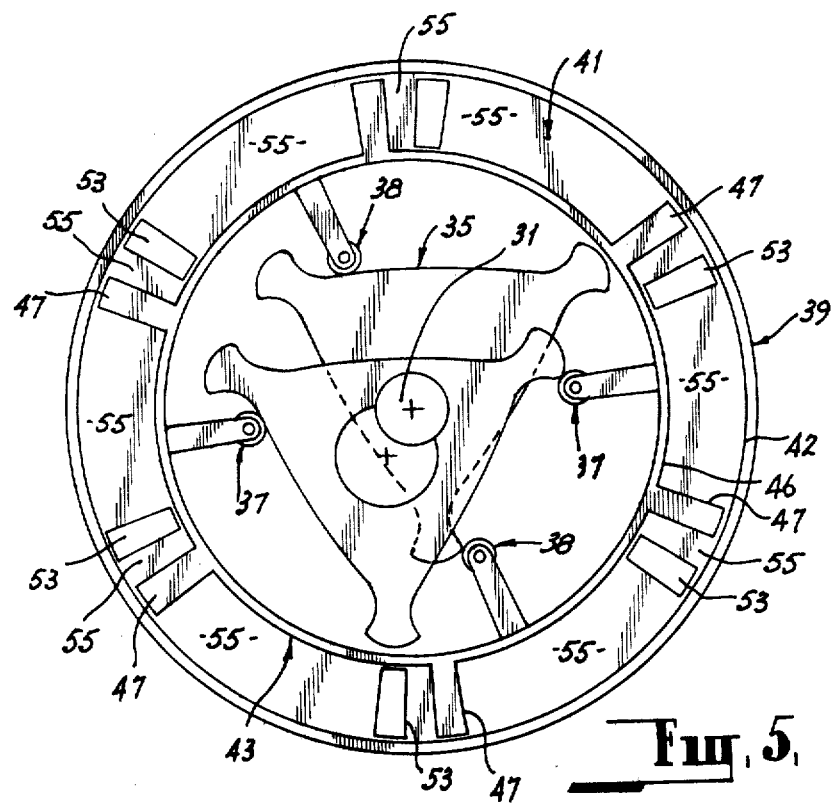
FIG. 5 is a schematic elevational view of one embodiment of a rotary mechanism incorporating a motion conversion device according to the invention.
Figure 6:
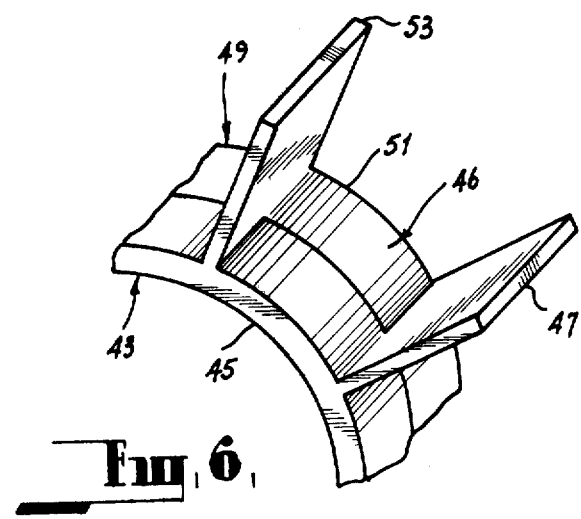
FIG. 6 is a fragmentary perspective view of the first and second piston assemblies of the rotary mechanism.

Referring now to FIGS. 5 and 6 there is shown a rotary mechanism of the "cat and mouse" type embodying a motion conversion device according to the invention. The rotary mechanism includes a crankshaft 31 on which first and second multi-lobed cams 33 and 35 respectively are eccentrically mounted. The cams 33 and 35 are mounted equidistantly from and on opposed sides of the axis of rotation of the crankshaft 31. Each cam has N lobes, N being an odd integer, equally spaced around and equidistant from the respective eccentric axis about which it rotates; in the illustrated embodiment, each cam has three lobes. The cams are arranged to rotate in the same direction as the crankshaft and at an angular velocity relative to the crankshaft $2/(N+1)$ times the angular velocity of the crankshaft.

A first pair of cam followers 37 are associated with the first cam 33 and a second pair of cam followers 38 are associated with the second cam 35. Each cam and its respective pair of cam followers is constructed in accordance with the invention and, accordingly, on the application of rotational motion of constant angular velocity to the crankshaft, the cam followers each undergo rotational motion having cyclic angular velocity. The first and second cams are so arranged that the pairs of cam followers undergo differential motion.

In the illustrated arrangement, one pair of cam followers is adapted to undergo cycloidal acceleration while the other pair of cam followers is adapted to undergo cycloidal deceleration and vice versa; that is, the acceleration cycles of the pairs of cam followers are 180° out of phase. This is achieved by arranging the first and second cams 33 and 35 respectively so that they are 180° out of phase with respect to each other.

The rotary mechanism includes a casing 39 within which there is defined an annular working chamber 41 of a form generated according to the theorem of Pappus. The chamber is bounded by a pair of side walls (not shown), a cylindrical outer wall 42 and a cylindrical inner wall 46, the inner and outer walls being centred on the axis or rotation of the crankshaft 31. A first piston assembly 43 associated with the first pair of cam followers 37 has a base 45 which rigidly carries a plurality of pistons 47 arranged to operate in the chamber 41. The base 45 also forms the carrier for the first pair of cam followers. A second piston assembly 49 associated with the second pair of cam followers 38 has a base 51 which rigidly carries a plurality of pistons 53. The base 51 also forms the carrier for the second pair of cam followers. The pistons 53 are equal in number to the pistons 47 and are in an interleaved relation therewith; in this way, each piston of one piston assembly is interposed between two pistons of the other piston assembly.

The first and second piston assemblies are positioned in a side by side relation and define the inner wall 46 of the chamber 41. As shown in FIG. 6 this arrangement is achieved by mounting each of the pistons 47 and 53 on its respective base for part of its length, the remainder of the piston being cantilevered.

The pistons 47 and 53 divide the chamber 41 into a number of working spaces 55 the angular length of each of which is variable as determined by the angular separation of the pistons. Sealing elements (not shown) are provided for maintaining fluid separation between the working spaces 55.

When the cam followers undergo differential rotational motion as described, the piston assemblies, which undergo motion in unison with their respective cam followers, alternately undergo acceleration and deceleration (one undergoing acceleration while the other is undergoing deceleration and vise versa), and adjcent pistons are thereby moved towards and away from each other in a "cat and mouse" action. In this way, the volumes of the working spaces are successively expanded and contracted.

Figure 7:
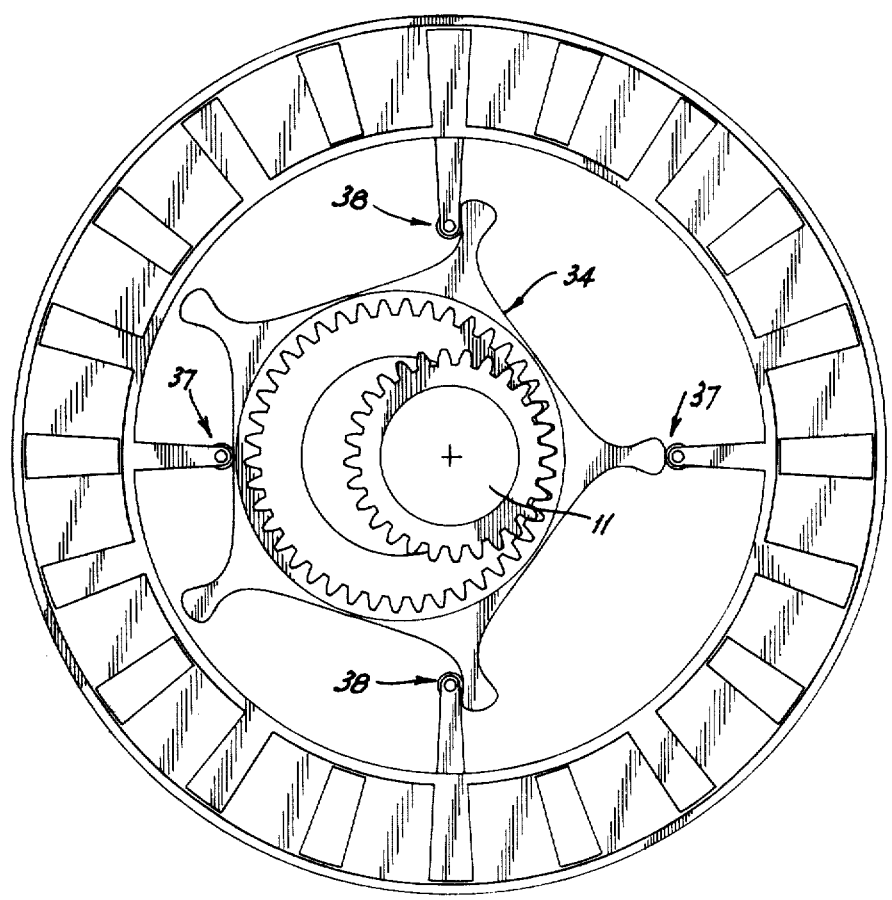
FIG. 7 is a schematic elevational view of a further embodiment of a rotary mechanism incorporating a motion conversion device according to the invention.

In an alternative arrangement as illustrated in FIG. 7 of the drawings, the two pairs of cam followers 37 and 38 are associated with a common cam 34. The cam is so formed as to be capable of effecting said differential rotational motion of the cam followers on rotation of the crankshaft 11 at a constant angular velocity.

Because the axis of rotation of the crankshaft 31 is co-incident with the axes about which the respective pairs of cam followers rotate, it is possible to selectively impose drag between the crankshaft and each respective pair of cam followers, or the assembly carrying the cam followers, to apply supplementary torque to the crankshaft or the said assemblies, as the case may be, when the cam followers are accelerating. The drag may be imposed by mechanical, hydraulic or electromagnetic means. It is preferable that the drag be imposed at positions diametrally opposed in relation to the axis of rotation of the crankshaft to minimise the imposition of reactionary forces on the respective bearings supporting the crankshaft and the assemblies carrying the respective pairs of cam followers.

For the rotary mechanism to act as a fluid pump, it is only necessary to drive the crankshaft at a constant angular velocity, and with suitable inlet and exhaust means admit fluid to each working space when it is approaching maximum volume and allow the fluid to leave when it is approaching minimum volume.

For operation of the rotary mechanism as an internal combustion engine of the compression ignition or spark ignition type, air or an air fuel mixture is drawn into each working space during the volume expansion stage thereof which constitutes the intake stroke. As the volume of the working space subsequently decreases, the air or the air-fuel mixture is compressed, and when the volume is at its minimum (or just before the minimum volume stage) fuel is injected into the working space, or in the case of a spark ignition engine, the air-fuel mixture is ignited. In the power stroke the gases expand, causing the "cat and mouse" action between the respective pistons and thereby applying rotational torque to the crankshaft. Intake and exhaust means are provided for the intake of fluid (that is, air or an air-fuel mixture) into expanding working spaces undergoing an intake stroke and for exhausting fluid (that is spent combustion gases) from working spaces undergoing an exhaust stroke.

It should be appreciated that the rotary mechanism may be adapted to function as either a two-stroke or a four-stroke internal combustion engine.

For the rotary mechanism to function as a motor driven fluid pump, one set of working spaces are adapted to receive a working fluid for effecting the motor function of the mechanism and the remaining set of working spaces function as pumping chambers. The pistons and their associated sealing elements prevent fluid communication between the motor or driving chambers and the pumping chambers, and thus the pumped fluid is not contaminated by the working fluid.

Referring now to FIGS. 8 to 11, there is shown a rotary mechanism arranged to operate as a four stroke internal combustion engine. The respective first and second piston assemblies 43 and 49 each has six radial pistons 47 and 53 arranged to operate in the annular chamber 41. The rotary mechanism is provided with intake ports 61 and exhaust ports 63 which comprise openings in the side wall of the casing 39. The intake ports 61 and the exhaust ports 63 are substantially the same angular width as the pistons and are adapted to be covered by the pistons when the working spaces 55 are at their maximum and minimum volume conditions. As each piston assembly has six radial pistons, twelve working spaces are defined within the chamber 41, and for the rotary mechanism to operate as a four-stroke internal combustion engine, three inlet ports and three exhaust ports are required.

Figure 8:
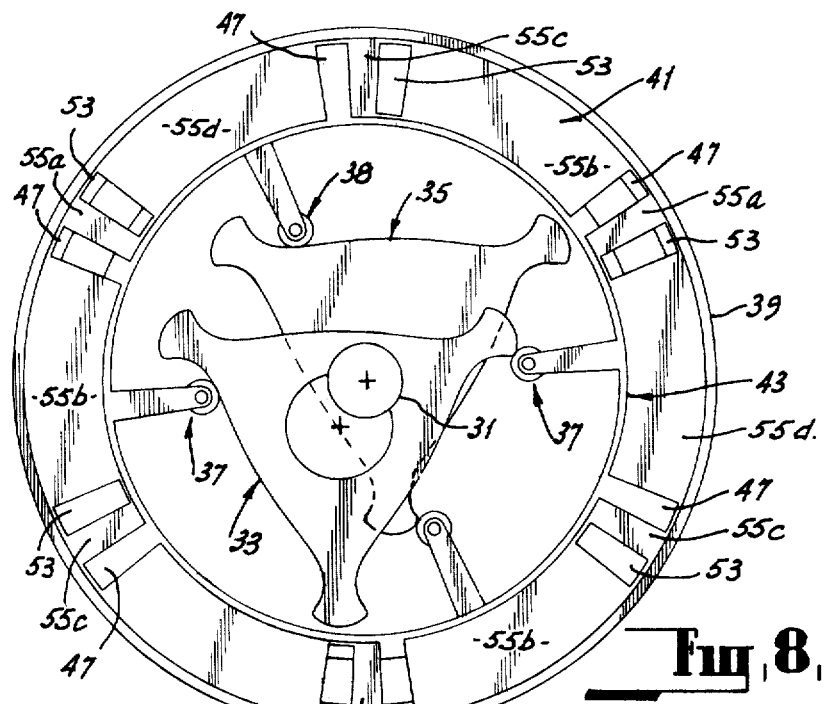
FIG. 8 is a schematic elevational view of a rotary mechanism arranged to operate as an internal combustion engine, the first (front) cam being shown at a position in which it has turned through 30° from its position at which its respective pair of cam followers were dwelling.
Figure 9:
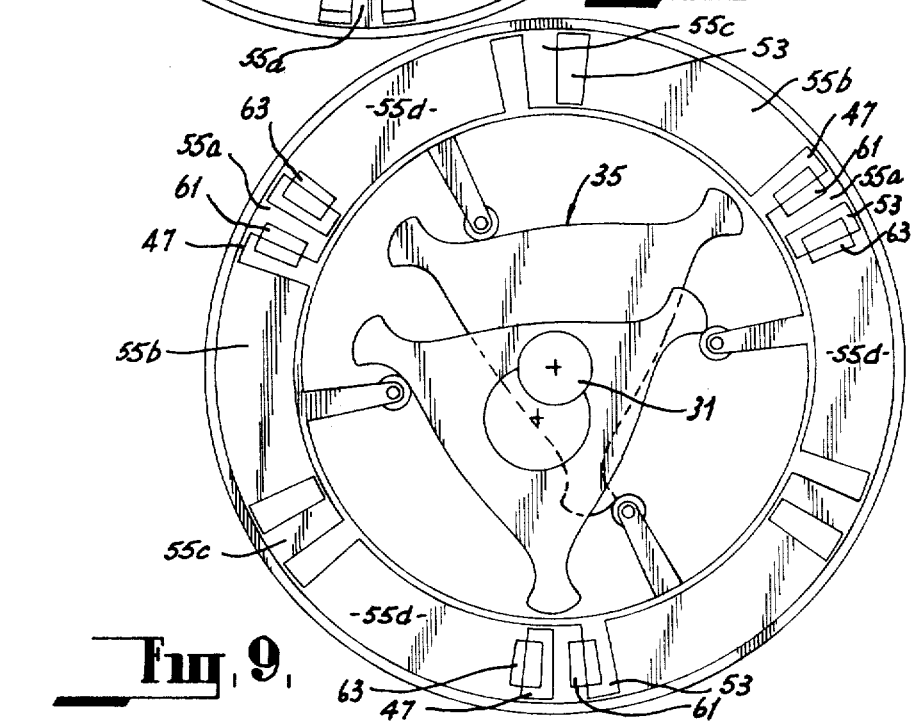
FIG. 9 is a schematic elevational view of the rotary mechanism of FIG. 8 with the first cam being shown at a position in which it has turned through 35° from its position at which its respective pair of cam followers were dwelling.

At this stage shown in FIG. 8, the first piston assembly 43 is in the leading position, the first cam 33 having rotated through 30° from the position it has occupied at the dwell position of the first piston assembly, and the second piston assembly, which is in the trailing position, is at the peak of its cycloidal deceleration. At this instant the piston assemblies are momentarily rotating at substantially the same angular velocity, and the respective working spaces are at their maximum and minimum volume conditions. The working spaces 55a have fully exhausted after completing an exhaust stroke, the working spaces 55b have been charged wih a combustible mixture after having completed an intake stroke, the working spaces 55c are charged with a compressed combustible mixture after having completed a compression stroke, and the working spaces 55d are fully expanded after having completed a power stroke. On ignition of the compressed combustible mixture in the working spaces 55c, the resultant expanding combustion gases cause the first piston assembly 43 to undergo cycloidal acceleration and thereby impart rotational torque to the crankshaft 31. As the first piston assembly continues its acceleration (FIG. 9), the intake ports 61 are opened into the working spaces 55a for the intake stroke thereof. Continued rotation of the second piston assembly 49 opens the exhaust ports 63 into the working spaces 55d; it should be noted that the second piston assembly is undergoing cycloidal deceleration at this stage.

FIG. 10 illustrates the stage at which the second piston assembly 49 is at its dwell position while the first piston assembly continues its rotation. At the end of the power stroke of the chambers 55c, the piston assemblies adopt a position (as shown in FIG. 11) in which the first piston assembly is trailing the second piston assembly (resulting from the cat and mouse action) and in which the intake ports 61 are closed off by pistons of the second piston assembly and the exhaust ports 63 are closed-off by pistons of the first piston assembly. The cycle is then repeated. With each power stroke, the particular piston assembly which initially undergoes acceleration imparts rotational torque to the crankshaft through its respective cam, while the crankshaft imparts rotational energy to the other piston assembly.

With the arrangement illustrated in FIGS. 8 to 11, each working space undergoes a four stroke internal combustion cycle three times for each revolution of the piston assemblies.

A motion conversion device according to the invention has applications in a rotary mechanism of the "cat and mouse" type in which multiple fluid processing operations are being performed. By way of example, the rotary mechanism may perform a first fluid processing operation in the form of an engine cycle which applies rotational torque to the crankshaft, and a second fluid processing operation in the form of a fluid pumping cycle which utilises rotational torque at the crankshaft to effect fluid pumping.

Referring now to FIGS. 12 there is shown a rotary mechanism of the "cat and mouse" type which executes an engine cycle and a fluid pumping cycle. The rotary mechanism includes a crankshaft 71 which is rotatably supported in a housing 73 through bearings (not shown). The crankshaft 71 is formed in two parts which are rigidly coupled together by a conventional coupling element 75.

First and second multilobed cams 77 and 79 respectively are rotatably mounted on the crankshaft 71 eccentrically of the axis of rotation of the crankshaft. The cams 77 and 79 are each of a form described hereinbefore and are disposed equidistantly from and on opposed sides of the axis of rotation of the crankshaft. The first and second cams are arranged to rotate in the same direction as the crankshaft 71 at an angular velocity relative to the crankshaft 2/(N+1) times the angular velocity of the crankshaft. First and second pairs of cam followers (hidden) are associated with the first and second cams respectively. Each cam and its respective pair of cam followers are arranged whereby the first and second pairs of cam followers do not undergo differential motion on rotation of the crankshaft; that is, the first and second pairs of cam followers are in phase when undergoing rotational motion.

A third multi-lobed cam 85 of a form hereinbefore described is rigidly attached to the first cam 77. A third pair of cam followers 87 is associated with the third cam 85.

The cams 77, 79 and 85 and their respective cam followers are constructed in accordance with the invention whereby cyclic angular velocity is imparted to each cam follower on the application of rotational motion of constant angular velocity to the crankshaft. The disposition of the third cam 85 with respect to the first and second cams is such that the third pair of cam followers undergo differential motion with respect to first and second pairs of cam followers. It is preferred that the acceleration cycle of the third pair of cam followers is 180° out of phase with respect to that of the first and second pairs of cam followers whereby the differential motion is such that the third pair of cam followers undergo acceleration while the first and second pairs of cam followers undergo deceleration, and vice versa.

A first piston assembly 89 is associated with the first pair of cam followers and a second piston assembly 91 is associated with the second pair of cam followers. The first and second piston assemblies each includes a base 93 which rigidly carries the respective pair of cam followers and which is rotatably supported substantially coaxial with the crankshaft 71 by way of a bearing 95 mounted on the housing 73.

An annular chamber 97 of a form generated according to the theorem of Pappus is provided within the housing 73, the annular chamber being bounded by an outer cylindrical wall 99, an inner wall 101 and a pair of side walls 103. A third piston assembly 105 associated with the third pair of cam followers 87 is arranged to operate in the chamber 97. The third piston assembly 105 includes a base 106 on which is carried a partition wall 107 which sealingly divides the chamber 97 into a pair of annular sub-chambers 109; the partition wall 107 illustrated is formed in two parts 107a and 107b for manufacturing purposes the parts being rigidly interconnected.

A plurality of pistons 111 are carried on the base 106 on each side of the partition wall 107 and are arranged to operate in the respective annular subchambers. The base 93 of the first piston assembly carries a plurality of pistons 113 which are arranged to operate in the subchamber 109a. The pistons 113 are equal in number to the pistons 111 in the sub-chamber 109a and are interleaved therewith so as to divide the sub-chamber into a plurality of working spaces 115. The base 93 of the second piston assembly carries a plurality of pistons 117 which are arranged to operate in the subchamber 109b. The pistons 117 are equal in number to the pistons 111 in the sub-chamber 109b and are interleaved therewith so as to divide the sub-chamber into a plurality of working spaces 115. The base 93 of the second piston assembly carries a plurality of pistons 117 which are arranged to operate in the subchamber 109b. The pistons 117 are equal in number to the pistons 111 in the sub-chamber 109b and are interleaved therewith so as to divide the sub-chamber into a number of working spaces 119. The pistons 111, 113 and 117 are provided with sealing elements to maintain fluid separation between the working spaces.

The first and second piston assemblies ar rigidly interconnected by connection means, such as securing bolts 121, whereby a driving force imparted to one of said piston assemblies may be transmitted to the other piston assembly through the connection means as well through the crankshaft 71.

The third piston assembly 105 is supported on a radial bearing 123 carried by the first and second piston assemblies, and a pair of thrust bearings 125 one of which is supported on the first piston assembly and the other of which is supported on the second piston assembly.

The inner wall 101 of the chamber 97 is defined by the respective bases of the first, second and third piston assemblies, sealing elements (not shown) being provided to resist egress of fluid from the working spaces.

Figure 13:
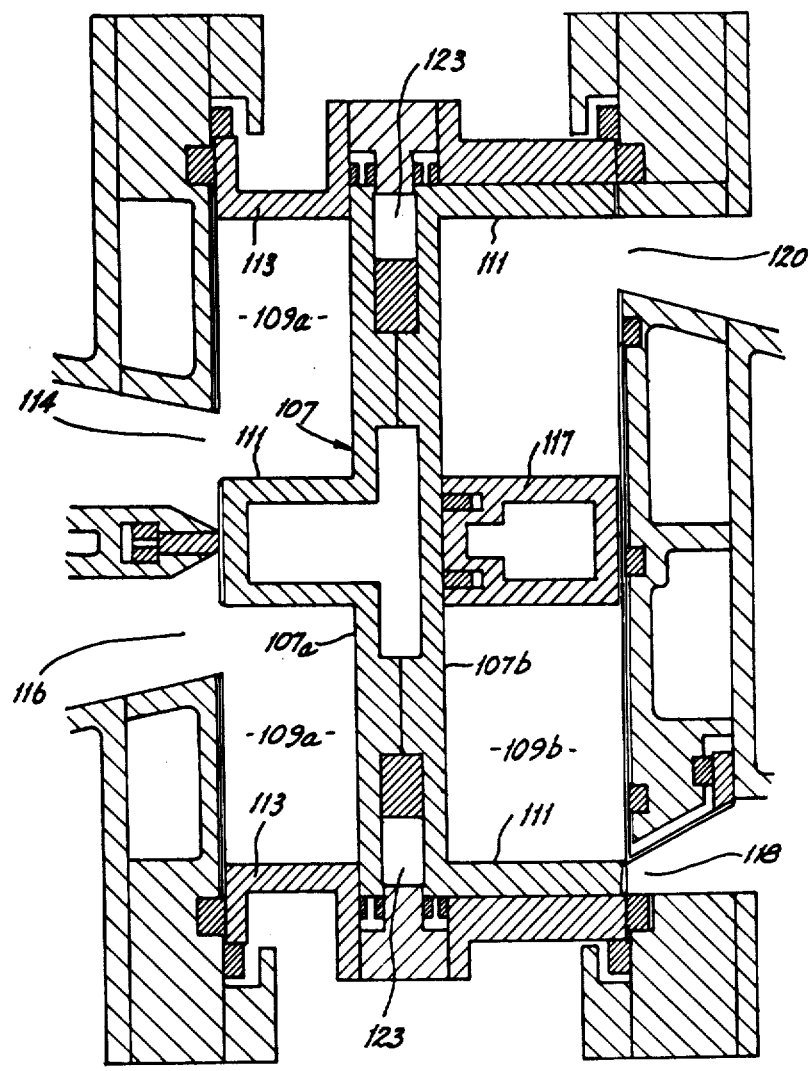
FIG. 13 is a section on line 13—13 of FIG. 12.

Intake and exhaust means are associated with the sub-chambers 109 for the intake of fluid into expanding working spaces undergoing an intake strike and for expelling fluid from contracting working spaces undergoing an outlet or exhaust stroke. Referring to FIG. 13, there is shown an intake port 114 and an outlet port 116 for working spaces performing the fluid pumping cycle, and an inlet port 118 and an exhaust port 120 for working spaces performing a power cycle.

The rotary mechanism is adapted to perform multiple fluid processing operations. The working spaces in the sub-chamber 109b perform the engine cycle which applies torque to the crankshaft and to the second piston assembly. The working spaces in the sub-chamber 109a perform the fluid pumping cycle.

Figure 14:
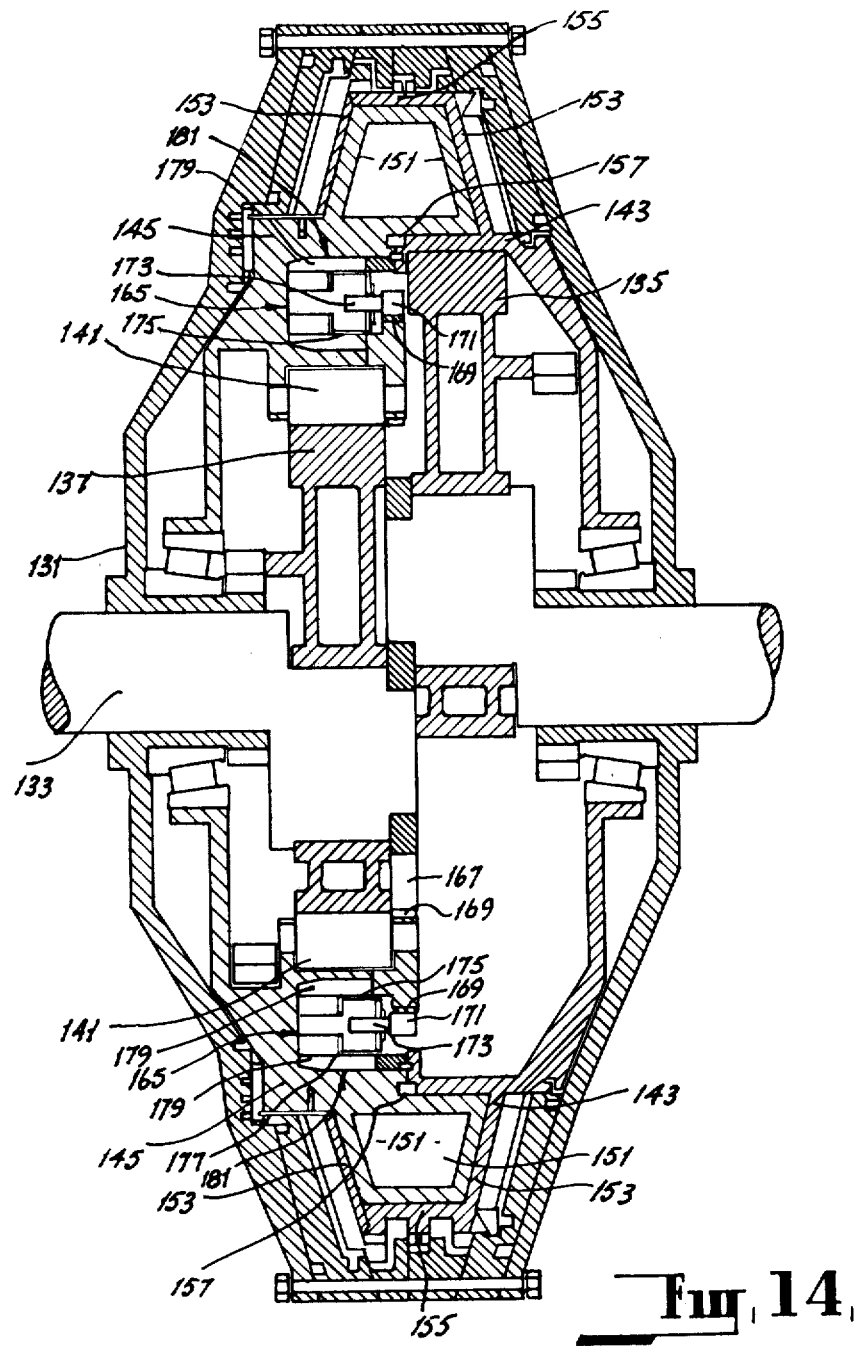
FIG. 14 is a sectional elevation of a further embodiment of a rotary mechanism arranged to perform multiple fluid processing operations.
Figure 15:
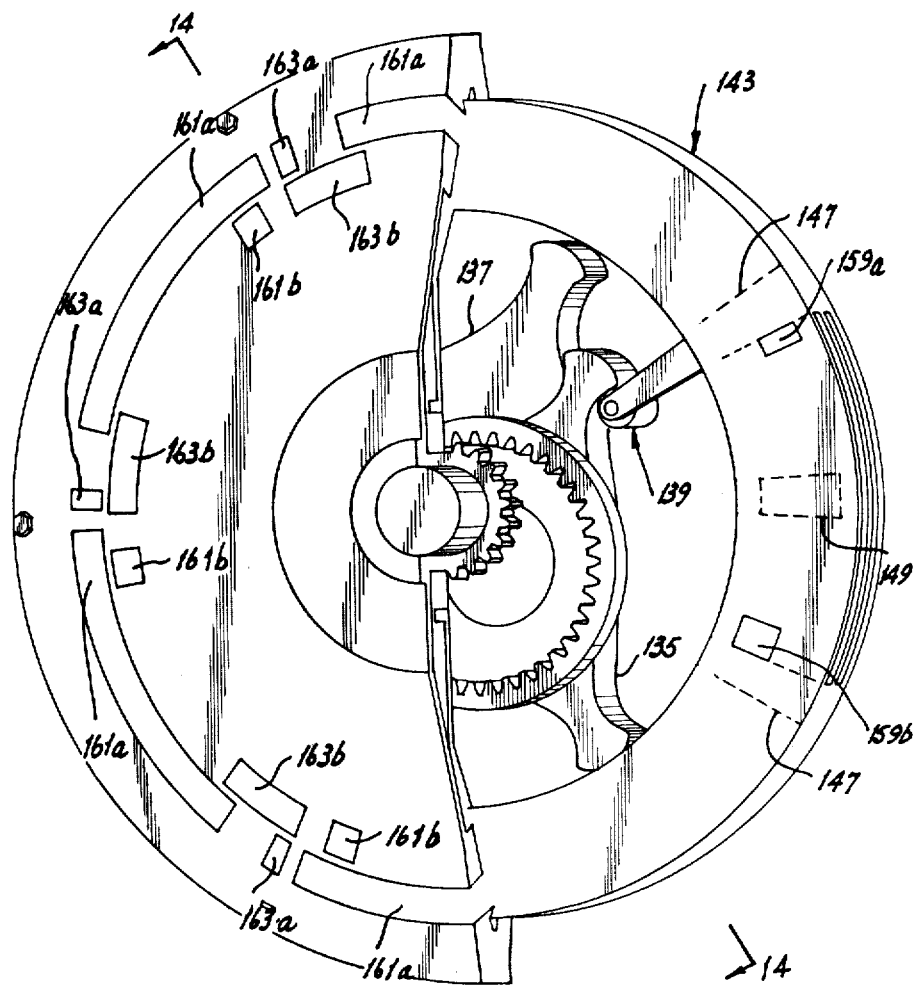
FIG. 15 is an oblique view of the rotary mechanism of FIG. 14 with a portion of the housing being broken away to reveal part of the motion conversion device and first piston assembly.

Referring now to FIGS. 14 and 15 there is illustrated a further rotary mechanism of the "cat and mouse" type which is adapted to perform a fluid motor cycle and a fluid pumping cycle. The rotary mechanism includes a stationary housing 131 in which a crankshaft 133 is rotatably supported. First and second multi-lobed cams 135 and 137 respectively, each of the form described hereinbefore, are rotatably mounted on the crankshaft eccentrically of the axis of rotation of the crankshaft. The cams 135 and 137 are disposed equidistantly from and on opposed sides of the rotational axis of the crankshaft. The cams are arranged to rotate in the same direction as the crankshaft at an angular velocity relative to the crankshaft $2/(N+1)$ times the angular velocity of the crankshaft. First and second pairs of cam followers 139 and 141 are associated with the first and second cams respectively. Each cam and its respective pair of cam followers is constructed in accordance with the invention and, accordingly, on application of rotational motion of constant angular velocity to the crankshaft, the cam followers undergo cyclic angular velocity. The first and second cams are so arranged that the first and second pairs of cam followers undergo differential motion, the differential motion preferably being such that the acceleration cycles of the pairs of cam followers are 180° out of phase, with one pair of cam followers undergoing acceleration while the other is undergoing deceleration, and vice versa.

A first piston assembly 143 is associated with the first pair of cam followers 139 and a second piston assembly 145 is associated with the second pair of cam followers 141, whereby as with the embodiments described beforehand, the piston assemblies undergo motion in unison with their respective cam followers. The first piston assembly has a plurality of pistons 147, and the second piston assembly has a plurality of pistons 149 which are equal in number to the pistons 147. The pistons are arranged to operate in an interleaved relation in a working chamber 151 which is bounded by a pair of side walls 153, an outer wall 155 and an inner wall 157. The outer wall 155 and side walls 153 are defined by the first piston assembly, and the inner wall 157 is defined by the first and second assemblies. In this way, the side walls and the other wall of the chamber rotate in unison with the first piston assembly.

The interleaved relationship of the pistons divides the chamber 151 into a plurality of working spaces, the maximum and minimum volumes of each of which need not necessarily be equal because in this instance the pistons in operation do not sweep completely around the working chamber. The arrangement of the working spaces is such that adjacent pairs of working spaces perform different fluid processing operations; that is, the engine cycle and the pumping cycle are performed by alternate pairs of working spaces. It is preferable that said pairs of working spaces are those working spaces defined between adjacent pistons 147 of the first piston assembly and the respective piston 149 interposed therebetween.

Inlet and exhaust means are provided for intaking fluid into an expanding working space and exhausting fluid from a contracting working space. In FIG. 15, there is shown the inlet and exhaust means for the alternate pairs of working chambers in which a working fluid operates to perform a motor cycle to thereby effect the "cat and mouse" action of the pistons. The inlet and exhaust means includes an orifice 159 communicating with each working space, the orifice being formed in one of the side walls 153, at a location adjacent the particular piston of the first piston assembly bounding the working space. Each orifice 159 is adapted to register successively with fluid intake ports 161 and fluid exhaust ports 163 formed in the housing. The respective orifice 159a communicating with the leading working space of each pair of working spaces is adapted to register with intake and exhaust ports 161a and 163a respectively, while the respective orifice 159b communicating with the trailing working space of each pair of working spaces is adapted to register with intake and exhaust ports 161b and 163b respectively.

In successive strokes, the first piston assembly rotates through a relatively small angular stroke length in moving from a trailing position to a leading position with respect to the second piston assembly, and through a relatively large angular stroke length in moving from a leading position with respect to the second piston assembly to a trailing position. The intake and exhaust ports are of unequal angular length so that one working space of each pair of working spaces is able to communicate with an intake port through its orifice while the other working space is communicating with an exhaust port and vice versa. During successive strokes of each pair of working spaces, the respective orifices communicates successively with an intake port and an exhaust port. It is preferred that the inlet and exhaust means for the pairs of working spaces performing the fluid pumping cycle be disposed on the opposed side of the working chamber to those for the pairs of working spaces performing the fluid motor cycle.

Sealing elements (not shown) are provided on the pistons to maintain fluid separation between the working spaces.

In addition, with the arrangement of ports shown in FIG. 15, it is preferable that sealing elements (not shown) be provided between adjacent inlet and exhaust ports of each separate set of ports. The sealing elements may comprise plate seals which are at least of equal area to that of the respective orifices, and which are resiliently urged into contact with the particular side wall 153 in which the orifices are formed.

It is also preferable to provide sealing elements (not shown) between adjacent portions of the inlet ports 161a and the exhaust ports 163b.

The rotary mechanisms described hereinbefore may be provided with means for selectively imposing drag between the crankshaft and the respective assemblies carrying the cam followers to thereby transmit supplementary torque therebetween when the respective cam followers are undergoing acceleration. One form of such drag imposing means will now be described with reference to the rotary mechanism illustrated in FIGS. 14 and 15.

Referring now to FIG. 14, the rotary mechanism is fitted with drag imposing means operating between the crankshaft and the first and second piston assemblies respectivly. The drag imposing means 165 comprises a pair of segmental cylindrical surfaces 167 (only one of which is visible in the drawing) formed integral with or rigidly attached to the crankshaft and disposed on diametrically opposed sides of the crankshaft with respect to each other. The axis about which each segmental cylindrical surface is generated is substantially co-incident with the axis of rotation of the crankshaft. A pair of idler rollers 169 diametrally opposed with respect to each other in relation to the axis of rotation of the crankshaft, are mounted on the second piston assembly 145 for rotation about respective axes which are substantially parallel to the axis of rotation of the crankshaft. A further pair of idler rollers operating in an equivalent manner to the rollers 169, are mounted on the first piston assembly 143 but are not visible in FIG. 14 because of the position of that piston assembly relative to the plane of the cross-section. The arrangement of the segmental cylindrical surfaces 167 and the idler rollers 169 is such that the idler rollers roll on the segmental cylindrical surfaces during only part of each cycle of motion of the second piston assembly, said part of the cycle of motion corresponding to the cycloidal acceleration phase of the second piston assembly. Similarly, said further pair of idler rollers roll on the segmental cylindrical surfaces 167 only when the first piston assembly is undergoing cycloidal acceleration. Each of the idler rollers 169 drivingly engages a driven roller 171 rigidly mounted on a shaft 173 which is rotatably supported on the second piston assembly. A cylindrical shell 175, which is constructed from material having permanent magnetic properties, is rigidly mounted on the shaft and is received within an annular air gap 177 in the poles 179 of an electromagnet 181 carried in the second piston assembly. The arrangement is such that the shell 175 rotates within the air gap 177 on rotation of the shaft 173. Magnetic hysteresis and eddy currents induced in and by the cylindrical shell 175 as it rotates within the air gap 177 of the electromagnet imposes drag on the rotating shell. The imposed drag is transmitted through the shaft 173 and driven roller 171 to the idler roller 169. Drag is also imposed on these elements as a result of friction on bearing surfaces and viscosity of the lubricant. Because of the drag experienced by the idler rollers when rolling on the respective segmental cylindrical surfaces, torque is transmitted between the idler rollers and the segmental cylindrical surfaces and thus between the piston assembly 145 and the crankshaft. Likewise, torque is transmitted between the crankshaft and the first piston assembly 143 when the latter is undergoing cycloidal acceleration.

I claim:

1. A motion conversion device comprising a cam mounted for rotation about an axis eccentric to a central axis, said eccentric axis being rotatable about said central axis, the cam having N lobes the outermost points of which are equally spaced around and equidistant from the eccentric axis, N being an odd integer other than 1, means for effecting relative rotation between the central axis and the cam on rotation of the eccentric axis about the central axis or rotation of the cam about its eccentric axis whereby the cam is arranged to rotate about its eccentric axis at an angular velocity of 2/N+1) times the angular velocity of the eccentric axis about the central axis, a pair of cam followers rotatable about an axis substantially coincident with the central axis, the cam followers being in contact with the cam on opposed sides of the central axis and equidistant from the central axis, the cam being formed such that on rotation of the eccentric axis about the central axis at a substantially constant velocity the cam followers undergo 2N cycles of acceleration from a dwell condition and deceleration to a dwell condition for each revolution of the cam followers.

2. A motion conversion device as claimed in claim 1 wherein the cam followers are mounted on a cam follower carrier which is rotatable about said central axis.

3. A motion conversion device as claimed in claim 1 or 2 wherein each cam follower comprises a roller the axis of rotation of which is substantially parallel to the central axis.

4. A motion conversion device as claimed in claim 3 wherein the cam is formed such that the distance between the outermost point of each cam lobe and a diametrally opposite point on the cam surface is substantially equal to the distance between the cam contacting surfaces of the cam followers.

5. A motion conversion device as claimed in claim 4 wherein the cam is rotatably mounted on an eccentric portion of a crankshaft, the axis of rotation of the crankshaft defining said central axis, and the central longitudinal axis of the eccentric portion defining said eccentric axis.

6. A motion conversion device as claimed in claim 5 wherein said means for effecting relative rotation between the central axis and the cam comprises an internal gear co-axial with the cam and rigidly attached thereto, the internal gear being in mesh with a gear wheel the central axis of which is co-incident with said central axis, the gear wheel being fixed against rotation relative to a stationary frame of reference.

7. A rotary mechanism, comprising a stationary housing in which there is defined a working chamber of a form generated according to the theorem of Pappus, a crankshaft the axis of rotation of which is substantially coincident with the axis of revolution about which the chamber is generated, at least one cam mounted on the crankshaft for rotation about an axis eccentric to the axis of rotation of the crankshaft, the or each cam having N lobes the outermost points of which are equally spaced around and equidistant from the respective eccentric axis, N being an odd integer other than 1, means for effecting relative rotation between the crankshaft and the or each cam on rotation of the crankshaft whererby the or each cam is arranged to rotate about the eccentric axis at an angular velocity of 2/(N+1) times the angular velocity of the crankshaft, two pairs of cam followers rotatable about an axis coincident with the axis of rotation of the crankshaft, the individual cam followers of each pair of cam followers being in contact with the cam or the respective cam on opposed sides of the axis of rotation of the cam followers and being equidistant from that axis, the or each cam being formed such that on rotation of the crankshaft at a substantially constant angular velocity each pair of cam followers undergoes 2N cycles of acceleration from a dwell condition and deceleration to a dwell condition for each revolution of the cam followers, the two pairs of cam followers being adapted to undergo differential motion, a piston assembly associated with each pair of cam followers whereby each piston assembly is adapted to undergo motion in unison with its respective pair of cam followers, each piston assembly having an equal number of pistons arranged to operate in said working chamber, the respective pistons of the piston assemblies being in an interleaved relation to thereby divide the working chamber into a plurality of working spaces, and wherein differential motion between the pairs of cam followers effects alternate expansion and contraction of the working spaces.

8. A rotary mechanism as claimed in claim 7 wherein said differential motion is of a form whereby the acceleration cycles of the piston assemblies are 180° out of phase.

9. A rotary mechanism as claimed in claim 7 or 8 wherein intake and exhaust means are provided for the selective intake of a fluid into working spaces undergoing expansion and the selective expulsion of fluid from working spaces undergoing contraction.

10. A rotary mechanism as claimed in claim 9 wherein each piston assembly has 2N pistons.

11. A rotary mechanism as claimed in claim 10 wherein there are two of said cams each having three lobes.

12. A rotary mechanism as claimed in claim 10 wherein there is one said cam, the cam having five lobes.

13. A rotary mechanism comprising a stationary housing in which there is defined a working chamber of a form generated according to the theorem of Pappus, a crankshaft the axis of rotation of which is coincident with the axis of revolution about which the working chamber is generated, one or more cams each mounted on the crankshaft for rotation about an axis eccentric to the axis of rotation of the crankshaft, the or each cam having N lobes the outermost points of which equally spaced around and equidistant from its respective eccentric axis, N being an odd integer other than 1, means for effecting relative rotation between the crankshaft and the or each cam on rotation of the crankshaft whereby the or each cam is arranged to rotate about its respective eccentric axis at an angular velocity of $2/(N+1)$ times the angular velocity of the crankshaft, first, second and third pairs of cam followers associated wit the cam or cams, the individual cam followers of each pair of cam followers being in contact with the cam or the respective cam on opposed sides of the axis of rotation of the cam followers and being equidistant from that axis, the or each cam being formed such that on rotation of the crankshaft at a substantially constant angular velocity each pair of cam followers undergoes 2N cycles of acceleration from a dwell condition and deceleration to a dwell condition for each revolution of the cam followers, the first and third pairs of cam followers being adapted to undergo differential motion with respect to each other, and the second and third pairs of cam followers being adapted to undergo differential motion with respect to each other, first second and third piston assemblies associated with the first, second and third pairs of cam followers respectively whereby each piston assembly is adapted to undergo motion in unison with its respective pair of cam followers, the third piston assembly having a partition wall arranged to sealingly divide the working chamber into a pair of working sub-chambers, the third piston assembly also having a plurality of pistons arranged to operate in each sub-chamber, the first piston assembly having a plurality of pistons arranged to operate in one of the sub-chambers, said first piston assembly pistons being equal in number to and interleaved between the pistons of the third piston assembly in said one sub-chamber to thereby divide that sub-chamber into a plurality of working spaces, the second piston assembly having a plurality of pistons arranged to operate in the other of said sub-chambers, said second piston assembly pistons being equal in number to and interleaved between the pistons of the third piston assembly in said other sub-chamber to thereby divide that sub-chamber into a plurality of working spaces, and wherein differential motion between the first and third pairs of cam followers effects alternate expansion and contraction of the working spaces in said one subchamber, and differential motion between the second and third pairs of cam followers effects alternate expansion and contraction of the working spaces in said other sub-chamber.

14. A rotary mechanism as claimed in claim 13 wherein inlet and exhaust means are provided for the selective intake of a fluid into working spaces undergoing expansion in said one sub-chamber and the selective expulsion of fluid in said working spaces undergoing contraction, and wherein further intake and exhaust means are provided for the selective intake of a fluid into the working spaces undergoing expansion in said other sub-chamber and the selective expulsion of fluid in said working spaces undergoing contraction.

15. A rotary mechanism as claimed in claim 13 or 14 wherein motion of the third pair of cam followers is 180° out of phase with respect to motion of the first pair of cam followers and the second pair of cam followers.

16. A rotary mechanism as claimed in claim 15 wherein the first and second piston assemblies are rigidly interconnected.

17. A rotary mechanism as claimed in claim 16 wherein there are three cams two of which are disposed equidistantly from and on opposite sides of the axis of rotation of the crankshaft and the third of which is rigidly attached to one of said two cams.

18. A rotary mechanism comprising a stationary housing, a crankshaft rotatably supported in the housing, at least one cam mounted on the crankshaft for rotation about an axis eccentric to the axis of rotation of the crankshaft, the or each cam having N lobes the outermost points of which are equally spaced around and equidistant from the respective eccentric axis, N being an odd integer other than 1, means for effecting relative rotation between the crankshaft and the or each cam on rotation of the crankshaft whereby the or each cam is arranged to rotate about its respective eccentric axis at an angular velocity of $2/(N+1)$ times the angular velocity of the crankshaft, two pairs of cam followers rotatable about an axis coincident with the axis of rotation of the crankshaft, the individual cam followers of each pair of cam followers being in contact with the cam or the respective cam on opposed sides of the axis of rotation of the cam followers and being equidistant from that axis, the or each cam being formed such that on rotation of the crankshaft at a substantially constant angular velocity each pair of cam followers undergoes 2N cycles of acceleration from a dwell condition and deceleration to a dwell condition for each revolution of the cam followers the two pairs of cam followers being arranged to undergo differential motion, a piston assembly associated with each pair of cam followers whereby each piston assembly is adapted to undergo motion in unison with its respective pair of cam followers, the two piston assemblies having a plurality of pistons arranged to operate in interleaved relation in a substantially annular working chamber, the working chamber being bounded by a pair of side walls, an inner wall and an outer wall, the pair of side walls and the outer wall being defined by and integral with one of the piston assemblies, the inner wall being defined by the two piston assemblies, the working chamber being divided into a plurality of working spaces by the interleaved pistons, and wherein differential motion between the two pairs of cam followers effect alternate expansion and contraction of the working spaces.

19. A rotary mechanism as claimed in claim 18 wherein intake and exhaust means are provided for selectively intaking fluid into expanding working spaces and for selectively expelling fluid from contracting working spaces.

20. A rotary mechanism as claimed in claim 19 wherein said intake and exhaust means comprise an orifice in the first piston assembly communicating with each working space, each orifice being adapted to communicate with a fluid intake port formed in the stationary housing on expansion of its respective working space and being further adapted to communicate with a fluid exhaust port formed in the stationary housing on contraction of its respective working space.

* * * * *